Figure 1:
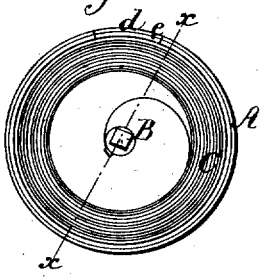

A. Wadsworth.

Watch.

No. 3,663. Reissued Oct. 5, 1869.

Witnesses
H. L. Wattenberg
A. W. Haight

Inventor
Arthur Wadsworth
per Hopkins & Haight
Attys

N. PETERS, PHOTO-LITHOGRAPHER, WASHINGTON, D. C.

United States Patent Office.

ARTHUR WADSWORTH, OF NEWARK, NEW JERSEY, FOR HIMSELF, AND ROBERT SCHELL, OF NEW YORK, N. Y., ASSIGNEE OF ARTHUR WADSWORTH.

*Letters Patent No.* 91,388, *dated June* 15, 1869; *antedated December* 15, 1868; *reissue No.* 3,663, *dated October* 5, 1869.

IMPROVEMENT IN THE ATTACHMENT OF MAIN-SPRINGS TO WATCH-BARRELS, &c.

The Schedule referred to in these Letters Patent and making part of the same.

*To all whom it may concern:*

Be it known that ARTHUR WADSWORTH, of Newark, in the county of Essex, and State of New Jersey, did obtain Letters Patent, dated June 15, 1869, and antedated December 15, 1868, for a new and useful Improvement in Watches, which Letters Patent, by virtue of an assignment, duly recorded in the Patent Office, were assigned, set over, and transferred to the said ARTHUR WADSWORTH and ROBERT SCHELL, of the city, county, and State of New York; and that the following description, taken in connection with the accompanying drawings, hereinafter referred to, forms a full and exact specification of the same, wherein are set forth the nature and principles of the said improvement, by which the invention may be distinguished from all others of a similar class, together with such parts as are claimed, and desired to be secured by Letters Patent.

This invention relates to a new and useful improvement in watches; and

It consists in a novel manner of connecting the main-spring of the watch to the barrel in which said spring is enclosed, whereby the connection is made to follow the spring, or approach in a direction toward the centre or arbor of the same, as the spring is wound up, and to recede or move outward from the centre or arbor of the spring, as the latter unwinds, thereby preventing the breaking of the spring—a contingency of frequent occurrence in the ordinary mode of connecting the outer end of the spring directly to the barrel.

In order to obtain the very desirable result above specified, a section or segment of the periphery of the barrel is cut out, and one end of said section or segment is hinged, or connected by pivots, to the main portion of the barrel, the opposite end of the section or segment being connected to the outer end of the spring, the parts being arranged in such a manner that the section or segment, when fully closed, and the spring is unwound, will be "flush" with the inner surface of the periphery of the barrel, and the full benefit of the spring obtained in its action upon the movement of the watch, and the action or power of the spring brought to bear upon the barrel more directly, or in a direction more concentrically therewith, than hitherto.

Or, if desirable, instead of cutting out a section or segment of the periphery of the barrel, the end of the main-spring may be provided with pivots, fitting into corresponding holes in the upper and lower sides of the barrel, so that as the spring is wound up, the pivots will turn, and allow the end of the spring to conform to the convolutions of the spring, without strain, and thus avoid the tendency to break at the point of juncture.

In the accompanying sheet of drawings—

Figure 1 is an internal view of the barrel of a watch, having a spring within it, in an unwound state, and attached to the barrel, in accordance with the invention.

Figure 2:
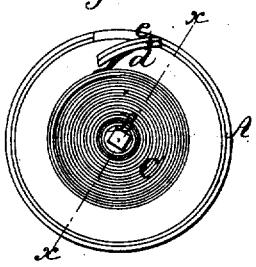

Figure 2, a view of the same, showing the spring fully wound up.

Figure 3:
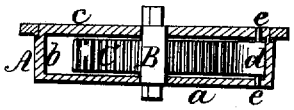

Figure 3, a section of figs. 1 and 2, taken in the line *x x*.

Figure 4:
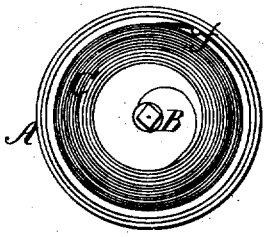

Figure 4, a view of the barrel of a watch, having a spring enclosed, and attached in the ordinary way.

Similar letters of reference indicate corresponding parts in the several drawings.

A represents the barrel of a watch, the bottom, *a*, and side, *b*, being in one piece, and the top, *c*, made separately, and fitted over the upper edge of the side, *b*, like a box-cover, the top, *c*, being sufficiently large in diameter to project beyond the side, *b*, and admit of being toothed, to communicate motion to the train.

B is an arbor, which passes loosely and centrally through the barrel, and

C is the watch-spring, fitted within the barrel, and having its inner end connected to the arbor B, as usual.

A section or segment of the side, *b*, of the barrel is removed or cut out, and the piece or segment *d* thus cut out, or a similar one, is inserted in its place, and secured at one end by pivots or pins *e*, which project from the upper and lower sides of the segment, and fit in suitable holes in the bottom, *a*, and top, *c*, of the barrel, said holes being made at such points that the segment *d*, when closed, so as to fill up the opening in the side, *b*, will be flush with both the exterior and interior surfaces of the side, *b*.

The outer end of the spring C is attached to the free or disengaged end of the segment *d*, and it will be seen that this segment forms the connection between the spring and the barrel. Hence, as the spring is wound up, the free or disengaged end of the segment will move inward, toward the arbor B, or centre of the spring, and as the spring is unwound, the free or disengaged end of the segment *d* will move outward from the arbor B, or centre of the spring. This will be fully understood by referring to figs. 1 and 2.

By this arrangement, therefore, the tension or pull of the spring is made to bear in a direction nearly concentric with the barrel, and the spring is not so liable to be broken, as when attached in the ordinary way, to wit, by means of a hook, *f*, and directly to the inner surface of the side of the barrel, as shown in fig. 3. The action of the spring will, consequently, be more uniform on the barrel; and, besides this, the full benefit of the spring obtained for the interior of the barrel is not enroached upon or monopolized by any part or parts whatever.

In the ordinary mode of connecting the outer end of the spring C to the barrel, the hook *f* prevents the spring uncoiling two turns, or takes up the room or space of two turns of the spring. This feature, in connection with the liability of the spring to break, owing to the strain or pull being materially out of the direction of the turning-movement of the barrel, and the inappreciable additional expense in adopting this improvement, which obviates the difficulties above alluded to, render this invention of material practical value in the manufacture of watches.

Having thus described the invention,

What is claimed as new, and desired to be secured by Letters Patent, is—

1. The pivoted segment *d*, fitted in the periphery or side, *b*, of the barrel A, with the pivots, which are at one end of the segment, working in fixed bearings in the barrel, and the opposite or free end of the segment attached to the outer end of the spring C, all arranged substantially as and for the purpose herein set forth.

2. The manner of attaching main-springs to watches, so that the end of the spring may turn on pivots fitted into fixed bearings in the upper and lower sides of the barrel.

ARTHUR WADSWORTH.
ROBERT SCHELL.

Witnesses:
H. L. WATTENBERG,
G. M. PLYMPTON.